United States Patent

[11] 3,593,568

[72] Inventors William D. Schmitz
Indianapolis;
Lewis E. Bovard, Lawrence; Larry G.
Durkos, Lawrence, all of, Ind.
[21] Appl. No. 812,056
[22] Filed Apr. 1, 1969
[45] Patented July 20, 1971
[73] Assignee Bio-Dynamics, Inc.
Indianapolis, Ind.

[54] PROTHROMBIN TIME MEASURING APPARATUS WITH MEANS TO START THE TIMER IN RESPONSE TO THE INITIAL DECREMENT OF OPTICAL TRANSMISSIVITY
8 Claims, 7 Drawing Figs.

[52] U.S. Cl. .................................. 73/64.1
23/230, 250/218, 356/39
[51] Int. Cl. ..................................... G01n 31/14,
G01n 33/16
[50] Field of Search ............................... 356/39;
73/64.1; 250/218; 23/230

[56] References Cited
UNITED STATES PATENTS

| | | | |
|---|---|---|---|
| 3,041,146 | 6/1962 | Kuzell ........................ | 73/64.1 UX |
| 3,302,452 | 2/1967 | Leslie ......................... | 73/64.1 |
| 3,307,392 | 3/1967 | Owen et al. ................. | 73/64.1 |
| 3,440,866 | 4/1969 | Ness et al. .................. | 73/64.1 |
| 3,450,501 | 6/1969 | Oberhardt ................... | 73/64.1 UX |
| 3,458,287 | 7/1969 | Gross et al. ................. | 356/39 X |

Primary Examiner—James W. Lawrence
Assistant Examiner—T. N. Grigsby
Attorney—Woodard, Weikart, Emhardt & Naughton ABSTRACT: A coagulation meter including automatic means for maintaining the test temperature at 37° C. A photocell is used to sense the change in turbidity of the contents of a cuvette. The test is started by the change in voltage output produced by the photocell when the final test component is injected into the cuvette and is ended by the change in photocell voltage output caused by the change in turbidity produced by clotting. The time between these two events is measured by a digital time circuit and display automatically actuated by a differentiation circuit and a detector circuit.

PROTHROMBIN TIME MEASURING APPARATUS WITH MEANS TO START THE TIMER IN RESPONSE TO THE INITIAL DECREMENT OF OPTICAL TRANSMISSIVITY

BACKGROUND OF THE INVENTION

1. Field of the Invention

This invention relates to apparatus for measuring plasma clotting time.

2. Description of the Prior Art

Various means have been used in the past for the determination of plasma clotting times. The results of such tests are particularly useful in anticoagulant therapy and in preparation for surgery. Some of the prior art equipment and procedures include timers which are started and stopped manually as well as the forming of insoluble fibrin network which will not conduct electricity. Also many of the prior art procedures require the exercise of judgment and opinion on the part of the technician running the test so that the accuracy of the test is less than might be desired.

SUMMARY OF THE INVENTION

One embodiment of this invention might include apparatus for coagulation testing comprising a cuvette; means for inserting a test activating component into said cuvette; a photocell; a light source; said photocell, light source and cuvette being so arranged that a change in the characteristics of the contents of said cuvette affects the amount of light delivered to said photocell; a circuit including said photocell; means for differentiating the output of said circuit; and means for detecting an output of a given amplitude from said differentiating means.

DESCRIPTION OF THE PREFERRED EMBODIMENT

DIFFERENTIATING AND DETECTING CIRCUITS

Figure 1:
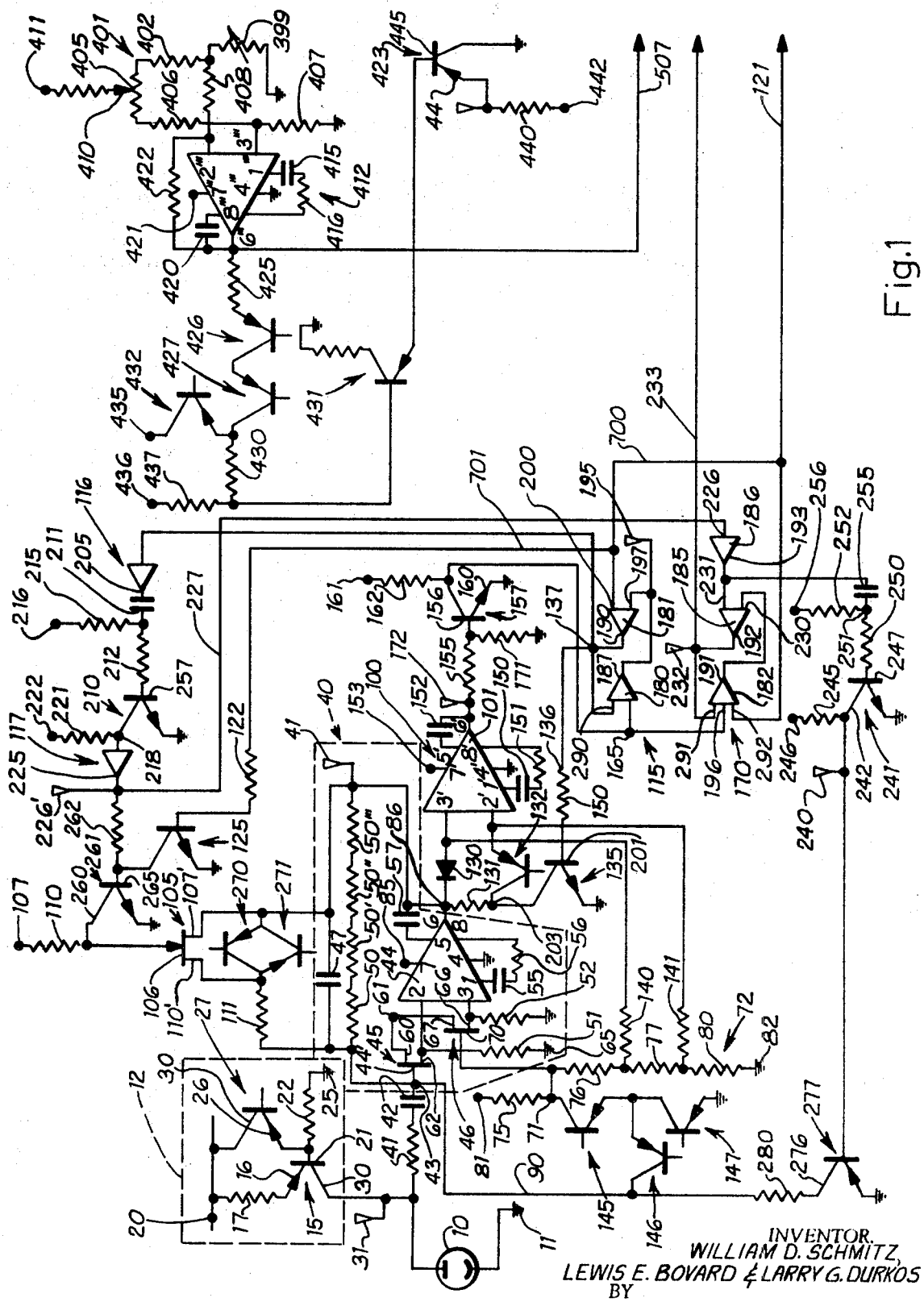
FIG. 1 is an electrical schematic diagram of a portion of a circuit of an apparatus embodying the present invention.

Referring more particularly to the drawings and to FIG. 1, there is disclosed a photocell 10 which is connected between ground 11 and a constant current source 12. The constant current source 12 includes a transistor 15 the emitter 16 of which is connected through a resistor 17 to a voltage source 20. The base 21 of transistor 15 is connected through the resistor 22 to ground 25 and is also connected to the emitter 26 of the transistor 27 the collector 30 of which is connected to the constant voltage source 20. In one specific embodiment of the invention, the various components of the constant current source have the following values:

| | |
|---|---|
| Resistor 17 | 5.6 KΩ |
| Resistor 22 | 4.7 KΩ |
| Transistor 15 | 2N4125 |
| Transistor 27 | 2N4916 |
| Voltage source 20 | 25 volts DC |

The function of transistor 27 is to hold the base of the transistor 15 at a constant voltage less than voltage at the constant voltage source 20. Thus the transistor 27 functions as a zener diode. Because the base 21 is clamped at a constant voltage, the transistor 15 conducts a constant current into its collector 30. Thus any change in the resistance of the photocell 10 produces a corresponding change in the voltage across the photocell 10. This voltage is herein referred to as $e_1$ and may be measured at the test point 31.

The voltage $e_1$ is coupled to a differentiator circuit 40 through series connected resistor 41 and capacitor 42. The purpose of the circuit 40 is to differentiate the input signal so that the output at test point 41 of the differentiator circuit will be $(de_1/dt)$. The differentiator circuit includes a basic operational amplifier 44 as well as dual field effect transistors 45 and 46 used to reduce the input bias current of the amplifier and further includes capacitor 47 as well as resistors 50, 50', 50'' and 50'''. In said specific embodiment of the invention the coupling components and the components of the differentiator circuit 40 have the following values:

| | |
|---|---|
| Resistor 41 | 47 KΩ |
| Capacitor 42 | 10 μf. |
| Field effect transistor 45 | |
| Field effect transistor 46 | 2N3958 |
| Resistor 50, 50', 50'', 50''' (each) | 18 meg.Ω |
| Capacitor 47 | 0.047 μf. |
| Operational Amplifier 44 | LM709 |

Also components associated with the differentiator circuit have the following values:

| | |
|---|---|
| Resistor 51 | 15 KΩ |
| Resistor 52 | 15 KΩ |
| Capacitor 55 | 470 pf. |
| Capacitor 57 | 27 pf. |
| Resistor 56 | 1.5 KΩ |
| Voltage source 61 | 25 volts |
| Voltage source 85 | 25 volts |

The field effect transistors 45 and 46 are used to reduce the input bias current of the amplifier 44. The gate 44' of the transistor 45 is coupled to the junction 43 and receives the input signal from the photocell. The drain 60 of the transistor 45 is connected to the voltage source 61 while the source 62 of the transistor is connected to ground 65 through the resistor 51. The input terminal No. 02 of the amplifier 44 is also connected to the source 62. The input terminal No. 03 of the amplifier 44 is connected to the source 66 of the transistor 46 while the drain 67 is connected to the voltage source 61. The gate 70 of the transistor 46 is connected to an intermediate point 71 in a voltage divider 72 which includes resistors 75, 76, 77 and 80. The one end 81 of the voltage divider is connected to a constant voltage source while the other end 82 thereof is connected to ground. The amplifier 44 has its terminal No. 01 coupled to its terminal No. 08 through series connected capacitor 55 and resistor 56. Terminal No. 04 of the amplifier is connected to ground while terminal No. 07 is coupled to constant voltage source 85. Terminal No. 05 is connected through capacitor 57 to the output junction 86 of the capacitor while terminal No. 06 is connected directly to the output junction.

If the resistor 41 is neglected, the input current into the junction 43 from the capacitor 42 is:

$$i_{43} = C_{42} \frac{de_1}{dt}$$

(See page II.19 Philbrick/Nexus manual 2d edition 1968, published by Philbrick/Nexus Research of Dedham, Mass. 02026.)

Since there is initially no flow in the line 90 from the junction 43, the feed back current to the junction 43 must be equal to $i_{43}$. Thus the voltage output of the differentiator at the test point 41 is $e_0$ where:

$$e_0 = i_c(R_{50} + R_{50'} + R_{50''} + R_{50'''})$$

$$= C_{42}\frac{de_1}{dt}(R_{50} + R_{50'} + R_{50''} + R_{50'''})$$

(See Philbrick/Nexus Manual Same Page)

The values of $C_{42}$ and $(R_{50}+R_{50'}+R_{50''}+R_{50'''})$ are selected such that a signal generated by a 12.5 percent dilution of normal plasma control when reacted in the optical module will produce sufficient signal when differentiated to trigger a stop detector or detector circuit 100 which includes operational amplifier 101 and associated parts. The resistor 41 and capacitor 42 are so chosen as to reduce the frequency response of the circuit so as to provide stable operation.

Consider now a specific example to illustrate the operation of the differentiator circuit. Thus $e_1$ might change from 10 volts DC to 15 volts DC. The time constant of the differentiator circuit is:

$$T = C_{42}(R_{50} + R_{50'} + R_{50''} + R_{50'''})$$
$$= 10 \times 10^{-6}(18 \times 4 \times 10^6)$$
$$= 720 \text{ seconds}$$

It can be appreciated that in order to provide quick reset a reset path must be provided or else the circuit will remain in a dynamic unbalanced state for a much longer period of time than that required to perform the test. Fast reset is provided by a field effect transister 105. The gate 106 of the transistor is connected to a constant voltage source 107 through resistor 110. The transistor 105 has its source 107' and drain 110' in series with resistor 111 with the resistor and transistor in shunt with the parallel connected capacitor 47 and resistors 50, 50', 50'', and 50'''. In said specific embodiment the resistor 111 has a resistance of 1 K$\Omega$ so that when the transistor is conducting a shunt path is provided which has the following time constant:

$$T=(C_{42})(R_{111})=(10 \cdot 10^{-6})(10^3)=10^{-2}$$
$$=0.01 \text{ seconds}$$

Figure 2:
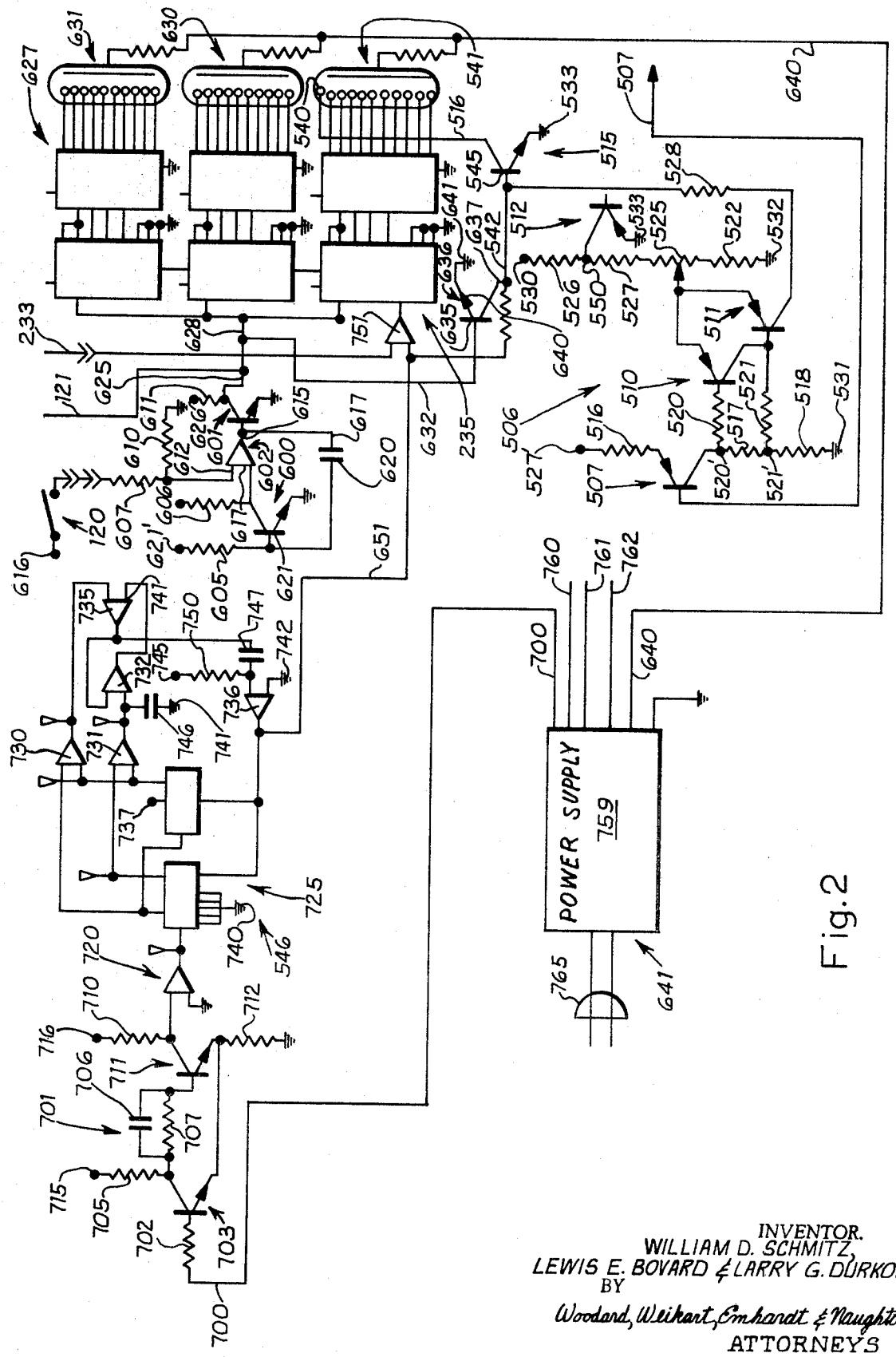
FIG. 2 is an electrical schematic diagram of a further portion of the circuit of FIG. 1.

The transistor 105 may be turned on by either of two inputs one coming from the flip-flop circuit 115 through the gates 116 and 117 and the other coming from a manual reset switch 120 (FIG. 2) through the line 121 resistor 122 and transistor 125.

Consider now the stop detector or detector circuit 100. The circuit includes the operational amplifier 101 the terminal No. 03' of which is coupled to the junction 86 through a diode 130 which is arranged to permit the flow of current through the diode 130 toward the junction 86 but to block the flow of current in a reverse direction. The circuit further includes the resistor 131 which connects the junction 86 to terminal 02' of the amplifier 101 through the emitter collector legs of transistor 132. Further components are transistor 135 the emitter of which is grounded and the collector of which is coupled to the collector of transistor 132. A resistor 136 connects the base of the transistor 135 to the junction 137. Both the operational amplifiers 44 and 101 are biased by the voltage divider 72 and associated resistors 140 and 141 as well as transistors 145, 146 and 147.

At this point it is desirable to provide a further table of component values for said specific embodiment:

| | |
|---|---|
| Resistor 75 | 2.2 K$\Omega$ |
| Resistor 76 | 2.2 K$\Omega$ |
| Resistor 77 | 220 $\Omega$ |
| Resistor 80 | 10 K$\Omega$ |
| Constant voltage source 81 | 25 volts |
| Operational amplifier 101 | LM709 |
| Field effect transistor 105 | 2N5163 |
| Constant voltage source 107 | +25 volts |
| Resistor 110 | 10 K$\Omega$ |
| Resistor 111 | 1 K$\Omega$ |

Table -Continued

| | |
|---|---|
| Resistor 131 | 10 K$\Omega$ |
| Resistor 122 | 10 K$\Omega$ |
| Transistor 125 | 2N4123 |
| Transistor 132 | 2N4916 |
| Transistor 135 | 2N4123 |
| Resistor 140 | 100 K$\Omega$ |
| Resistor 141 | 100 K$\Omega$ |
| Transistor 145 | 2N4916 |
| Transistor 146 | 2N4916 |
| Transistor 147 | 2N4916 |

With the above specific values the bias voltages at the various junctions of the voltage divider can be determined. Thus the three transistors 146, 145 and 147 function as zener diodes with the transistor 146 acting to prevent the voltage between the two bases 44 and 70 of the field effect transistors 45 and 46 from becoming so great as to prevent circuit operation. The two transistors 145 and 147 function to clamp the junction 71 at 12.5 volts. The current through the resistors 76, 77 and 80 can then be calculated to be 1.0 ma. which also determines the bias voltages at the input pin No. 03' to be 10.2 volts DC and the input pin No. 02' to be 10.0 volts DC.

The amplifier 101 has associated therewith capacitor 150 and resistor 151 arranged in series and coupled between pins No. 01' and No. 08' of the amplifier. Pin No. 07' is connected to a constant voltage source 153. Pin No. 04' is connected to ground while pin No. 05' is connected through capacitor 152 to output pin No. 06'. The output of the amplifier 101 is fed through resistor 155 into the base 156 of transistor 157. The emitter 160 of the transistor is connected to ground while the collector of the transistor is connected to constant voltage source 161 by resistor 162 as well as to a junction 165 which serves as an input junction for both the flip-flop 115 and another flip-flop circuit 170. Bias resistor 171 is also provided connected between ground and the base 156 of the transistor 157. The output of the amplifier or switch 101 can be read at test point 172.

Figures 3, 4, 5:
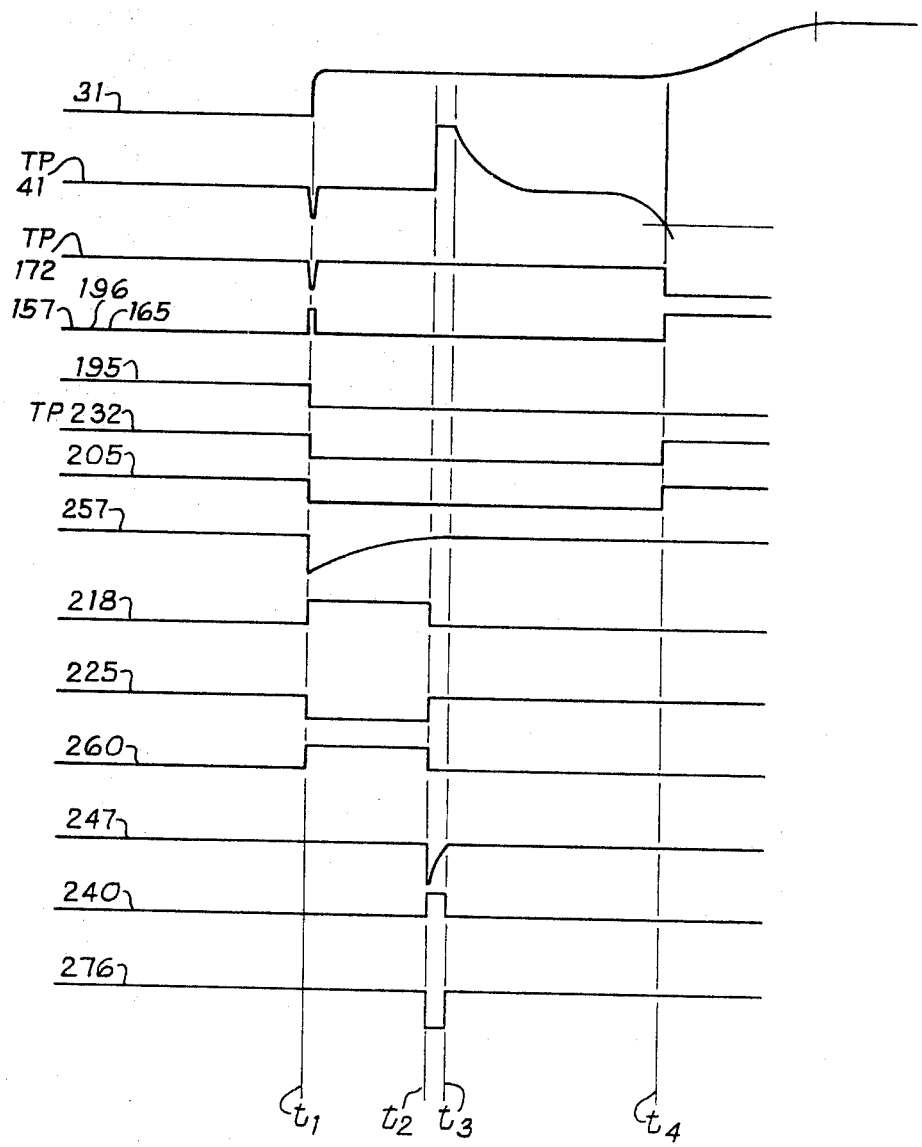
FIG. 3 is a schematic diagram of a gate used in the present apparatus.
FIG. 4 is a schematic diagram of a further gate used in the present apparatus.
FIG. 5 is a graph of various voltage levels throughout the apparatus shown on a time base.

Consider now the gates 180 and 181 (which are both "and" gates) which make up the flip-flop 115, the gates 182 and 185 (which are both "and" gates) which make up the flip-flop 170 and the gates 116, 117 and 186. Such gates are well known in the logic art and it is sufficient for the present description to review the effect of placing a plus signal on the various pins of the gate. In FIG. 3 a representative three terminal gate is illustrated. The following graph shows for a three-terminal gate the effect of placing a positive signal on the various terminals of the gate with a signal or no signal on other terminals of the gate. The sign 1 represents a signal while the sign 0 represents no signal

| Pin | | | | |
|---|---|---|---|---|
| A | 1 | 1 | 0 | 0 |
| B | 0 | 1 | 1 | 0 |
| C | 0 | 0 | 0 | 1 |

In FIG. 4 a representative four-terminal gate is illustrated with the effects of placing various signals on the pins being shown in the graph below.

| Pin | | | | | | | | |
|---|---|---|---|---|---|---|---|---|
| A | 1 | 1 | 1 | 0 | 0 | 0 | 0 | 1 |
| B | 0 | 1 | 0 | 1 | 0 | 1 | 0 | 1 |
| C | 0 | 0 | 1 | 0 | 1 | 1 | 0 | 1 |
| D | 0 | 0 | 0 | 0 | 0 | 0 | 1 | 0 |

In the case of the gates 116, 117 and 186 a signal on the input produces no signal on the output while no signal on the input produces a signal on the output (so that these gates act as invertors).

The various gates might be provided by two commercial block boxes with a Motorola (3-3 input gate) providing the three gates 182, 185 and 186 and a Motorola (quad 2 input gate) providing the gates 116, 117, 180 and 181.

Referring now to FIG. 5, there is illustrated a graph which shows the voltage levels at various test points and at various times throughout the operation of the apparatus. Assume now that the photocell is actuated to change its resistance from 10 volts to 15 volts by the injection of plasma into the cuvette. Assume further that this event occurs at $t1$ as marked on FIG. 5. Thus the voltage $e1$ at test point 31 will change abruptly from 10 volts to 15 volts as indicated in the graph. The voltage at test point 41 on the output side of the differentiator circuit will abruptly dip in a negative direction from a steady state value of 12.5 volts and will immediately return to this value. The voltage at test point 172 on the output side of the gate 101 will also dip from its steady state value of 25 volts DC to approximately 23.5 volts and will then return to 25 volts DC.

The transistor 157 will normally have its collector output at a voltage of zero volts because the transistor 157 will be conducting. The signal at TP 172 will turn off the transistor temporarily and cause the output to the junction 165 to rise to 5 volts. Prior to the inserting of the plasma the output terminal 187 of the gate 180 will be at "1." The output terminal 190 of the gate 181 will be at "0." The output terminal 191 of the gate 182 will be at "0" while the output terminal 192 of the gate 185 will be at a "1." The gate 186 will have its output terminal 193 at "0" while the gates 116 and 117 will have their output terminals at "1."

As mentioned the junction 165 receives a 5 volt positive signal which is a "1" and which drives terminal 187 to a "0" so that test point 195 goes to "0." The gate 182 also receives this positive signal at its center input terminal 196; however, the gate 182 output terminal 191 is at "0" and remains at "0." The change from "1" to "0" at 187 causes the input terminal to go from a "1" to a "0." Since input terminal 200 of gate 181 is at "0," output terminal 190 goes to a "1." This positive signal is delivered to the base 201 of the transistor 135 turning on the transistor and putting the junction 203 of the resistor 131 and the transistor 132 at ground potential. When the junction 203 is so maintained at ground potential, no positive output signal from the differentiator circuit can trigger the detector 100.

As explained above when $e_0$ goes negative the flip-flop 115 is flipped. It should be mentioned that flip-flop 115 can also be flipped to set position by a positive pulse from the detector. This can occur as the result of a positive differentiator output being delivered to the junction 86. Such a positive pulse causes the pin No. 02: to go more positive than the pin No. 03: causing the transistor 157 to turn off temporarily and to provide a signal to the flip-flop circuit in the same fashion as above described.

Referring back again to FIG. 5, the circuit is still at $t_1$. The gate 116 which initially has its output terminal at "1" is actuated by the "1" now at the junction 137 so that the output terminal 205 goes to "0." The gate 116 is coupled to the transistor 210 through capacitor 211 and resistor 212. The resistor 215 connects a constant voltage source 216 to the junction of the capacitor 211 and the resistor 212. The capacitor 211 and the resistor 215 function as a time delay and provide a decay time of approximately 8 seconds so that after this period of time the terminal 205 is returned to its initial "1" condition even through the input of the gate is at a "1." At $t_1$ however the "0" condition of the gate is transmitted to the transistor 210 through the resistor 212. The transistor 210 has its collector 220 connected to a resistor 221 the other end of which is connected to constant voltage source 222. Because of the positive voltage normally present on the base of the transistor 210 from the voltage source 216, the transistor 210 is normally turned on and the input pin 218 to the gate 117 is normally at "0." The input goes to a "1" however by reason of the turning off of the transistor and the output pin 225 goes to "0." Thus the voltage at test point 226' goes to "0."

This "0" condition is transmitted to the input pin 226 of the gate 186 through the line causing the input to go to "0" and the output to go to a "1." As mentioned, the output 191 is at "0." Consequently the input terminal 230 of the gate 185 is at "0." When the output 193 of gate 186 goes to "1," the input 231 also goes to "1" and the output 192 goes to "0." The output 192 is reflected in the graph FIG. 5 at 232 which represents the test point 232 in FIG. 1. The line 233 leads away from the test point 232 into circuitry illustrated in FIG. 2. The line 233 leads to a counter 235 which includes a lighted display of the number of seconds and fraction of seconds from the initiation of the apparatus. This apparatus is described in more detail below; however, when the line 233 is at "0" the counter counts and when the line is at "1" the counter is inhibited and does not count. Thus the counter starts counting at $t1$.

The changing of the output 193 of gate 186 from "0" to "1" has no effect at test point 240 at $t1$ because the transistor 241 remains turned on thus keeping the collector 242 at ground potential through the transistor. The resistor 245 is connected to a constant voltage source 246. The base 247 of the transistor 241 is connected to resistor 250 which is connected to junction 251 to which resistor 252 and capacitor 255 are connected. Resistor 252 is coupled to constant voltage source 256 while the capacitor 255 is connected to the output 193 of gate 186. When at $t1$ the voltage at the input to the capacitor goes positive, the transistor 241 is not turned off because the base voltage remains positive.

In FIG. 5 the voltage throughout the cycle is plotted for the output pin 205 of gate 116. The base 257 of the transistor 210 is also plotted showing that at $t_1$ the voltage drops from a value of +0.6 volts DC to a value of −5 volts and then gradually returns to the +0.6 volts DC level during a period of 8 seconds through the decay of the capacitor 206 and the resistor 215. The plot 218 shows the voltage at the collector of the transistor 210 while the plot 225 shows the voltage at the output pin of the gate 117.

Also plotted and indicated by 260 is the voltage at the collector 260 of the transistor 261 which changes from 0 VDC to 25 volts DC at $t1$. This change is caused by the transmission through resistor 262 of the "0" condition at the output pin 225 of gate 117 to the base 265 of the transistor 261 which turns off the path to ground through the transistor emitter. Thus the base of the field effect transistor is raised to a plus 25 volt DC potential switching the transistor on and shorting out the transistors 270 and 271 which act as zener diodes. Thus, as explained above the circuit has a fast reset path through the capacitor 47 and resistor 111 instead of resistors 50, 50', 50" and 50"'. The remaining two plots on the graph are the base 247 of the transistor 241 and the collector 276 of the transistor 277.

Reference to FIG. 5 will indicate the various changes that take place throughout the cycle. Thus, during the 8 second period after $t_1$ the voltage 257 gradually increases until $t2$ when the transistor turns off and its collector 218 goes to a "1" whereupon the gate output pin goes to a "0." The input 226 of gate 186 goes to "0" and the output 193 goes to a "1." The circuit including the transistor 241 operates on the signal coming into the capacitor 255 so as to produce the signal shown in FIG. 5 at 240. It can be seen that the transistor 241 is turned off for the period beginning at $t_2$ and ending at $t3$ because the base of transistor 241 instantaneously goes negative but by $t_3$ has returned to +0.6 volts DC. The positive pulse at 240 turns on the transistor 277 and causes its collector 276 to go to ground potential. The resistor 280 connects the collector 276 to the junction 43. Thus the turning on of transistor 277 causes a current to pass through the resistor 280. Since the resistor has a resistance of 220K, the current $i2$ is as follows:

$$i_2 = \frac{e_{44}}{R_{280}} = \frac{15}{220\text{K}} = .068 \times 10^{-3} \text{ amps}$$

This current flows out of the base 44 of the field effect transistor 45. The loss of current is sensed by the amplifier 44 which drives its output positive until the zener diode 271 conducts through resistor 111 supplying the current $i2$ and thus keeping the junction 43 at practically the same potential it was before the transistor 277 fired. When the transistor turns off at $t_3$, the output of the amplifier 44 will be positive by an amount equal to the zener voltage of the diode 271 so that assuming the voltage at the junction 43 to be 15 volts and the zener voltage to be 6.5 volts, the voltage at test point 41 is about 21.5 volts.

This jump in voltage is shown for test point 41 in FIG. 5. It is necessary for this voltage to decay exponentially through resistors 50, 50', 50" and 50''' and capacitor 47. The time constant of this decay is:

$$t = C_{47}(R_{50} + R_{50'} + R_{50''} + R_{50'''})$$
$$t = (.047 \times 10^{-6})(72 \times 10^6)$$
$$t = 3.38 \text{ seconds}$$

The wave form for the decay is shown in the graph at 41. The positive values on the output of the differentiator do not fire the detector 100 for the reasons given above. In other words the diode 130 blocks any flow of positive current to input pin No. 03 of the detector 100. Also the maximum voltage on the two pins No. 02 and No. 03 is controlled by the voltage at the junction 71 which is approximately 12.5 volts. The voltage output from the differentiator does not go substantially below this level until a reaction takes place in the test tube and the voltage across the photocell begins to increase substantially by reason of less light transmitted through the cuvette. This is shown in FIG. 5 as occurring at $t_4$.

When the voltage $e_1$ increases the voltage at test point 41 decreases. Prior to $t_1$ the voltage at pin No. 03 of the detector has been slightly more positive than the voltage at pin No. 02. However as the voltage goes down at the differentiator output, current flows through the diode 130 and the voltage at pin No. 03 drops to the point where it is equal to the voltage at pin No. 02 at which time the detector switches off and the voltage at test point 172 drops from 25 volts DC to approximately 1.5 volts DC The transistor 157 is turned off and the voltage at its collector and at the junction 165 goes to 5 volts DC or, in other words, to a "1."

It will be remembered that junction 137 is at "1" so that the input 290 is at a "1." Consequently the changing of the collector of transistor 157 from "0" to "1" has no effect on output 187 which remains at "0." The gate 182, however, has one input 291 at "0." As mentioned above the input terminal 200 is at "0" which is also true of the input terminal 292 of the gate 182. Thus, when the input terminal 196 goes from "0" to "1," the output pin 191 goes from a "1" to a "0." The input pin 231 of the gate 185 is at "0." Consequently, when the input pin 230 goes from "1" to "0," the output pin 192 goes from "0" to "1" putting the test point 232 at "1." The line 233 operates the counter 235 stopping the counter at the time which is currently displaying at $t_4$.

In said specific embodiment of the invention the various above-described components have the following values:

| | |
|---|---|
| Capacitor 150 | 470 pf. |
| Resistor 151 | 1.5 K |
| Constant voltage source 153 | z25 Volts DC |
| Capacitor 152 | 27 pf. |
| Resistor 155 | 15 KΩ |
| Transistor 157 | 2N4123 |
| Constant voltage source 161 | z5 Volts DC |
| Resistor 162 | 2.2 KΩ |
| Resistor 171 | 1 KΩ |
| Gate 182 | |
| Gate 185 | Motorola (3–3input gate) |
| Gate 186 | |
| Gate 116 | |
| Gate 117 | Motorola (quad 2 input gate) |
| Gate 180 | |
| Gate 181 | |
| Transistor 210 | 2N4124 |
| Capacitor 211 | 47 zf. |
| Resistor 212 | 10 KΩ |
| Resistor 215 | 270 KΩ |
| Constant voltage source 216 | z5 Volts DC |
| Resistor 221 | 10 KΩ |
| Constant voltage source 222 | z5 Volts DC |

Table .-Continued

| | |
|---|---|
| Transistor 241 | 2N4124 |
| Resistor 245 | 10 KΩ |
| Constant voltage source 246 | z5 Volts DC |
| Resistor 250 | 10 KΩ |
| Resistor 252 | 220 KΩ |
| Capacitor 255 | 1 zf. |
| Constant voltage source 256 | z5 Volts DC |
| Transistor 261 | 2N4123 |
| Transistor 270 | 2N4916 |
| Transistor 271 | 2N4916 |
| Transistor 277 | 2N4123 |
| Resistor 280 | 220 KΩ |

INCUBATOR CONTROL CIRCUIT

The cuvette in the present apparatus is held at a constant temperature during the carrying out of the coagulation test by a circuit 401. The circuit includes a temperature sensitive thermistor 399 which measures the temperature of the incubator. The thermistor 399 is one of the legs of a bridge circuit which includes five resistors 402, 405, 406, 407 and 408. An adjustment wiper 410 is provided which makes possible adjusting the voltage at pins 2''' and 3::: of amplifier 412 to be equal when the incubator block is at 37° C. If the temperature of the block deviates from 37° C., the resistance of the thermistor changes and the voltage across it changes. This voltage difference is amplified by the operational amplifier 412. The pin 1''' of the amplifier is connected to a capacitor 415 which is connected through resistor 416 to pin 8''' of the amplifier. The output pin 6''' of the amplifier is connected through capacitor 420 to pin 8''' of the amplifier. Pin 7''' of the amplifier is connected to a constant voltage source 421 while pin 4''' is connected to ground. Resistor 422 connects input pin 2''' to output pin 6'''.

The amplifier 412 drives a power transistor 423 which is mounted on the incubator block. The coupling to the power transistor is by way of resistor 425, transistor 426, transistor 427, resistor 430 and transistor 431. The circuit further includes transistor 432 which has its collector connected to constant voltage source 435 and its emitter connected between the resistor 430 and the transistor 427. A constant voltage source 436 is coupled by resistor 437 to the circuit between the resistor 430 and the transistor 431. The power transistor 423 is located on the incubator block so that heat from the transistor heats the incubator block. A resistor 440 is located in the emitter leg 441 of the transistor 423 and connects the emitter to a constant voltage source 442. The voltage at the base 445 of the transistor controls the current through the transistor and also controls the power dissipated to the incubator block. The function of the transistors 426 and 427 is as zener diodes to provide approximately a 12.5 volt offset between the base of transistor 431 and the output pin 6''' of the amplifier so as to provide proper bias conditions for the amplifier.

In said specific embodiment the following component values are used:

| | |
|---|---|
| Resistor 402 | 4.7 KΩ |
| Resistor 405 | 2 KΩ |
| Resistor 406 | 4.7 KΩ |
| Resistor 407 | 1820 X |
| Resistor 408 | 10 KΩ |
| Amplifier 412 | LM709 |
| Capacitor 415 | 470 pf. |
| Resistor 416 | 1.5 KΩ |
| Capacitor 420 | 27 pf. |
| Constant voltage source 421 | z25 volts DC |
| Resistor 422 | 1 megohm |
| Transistor 423 | |
| Resistor 425 | 2.2 KΩ |
| Transistor 426 | 2N4916 |
| Transistor 427 | 2N4916 |
| Resistor 430 | 1 KΩ |
| Transistor 431 | 2N3638 |
| Transistor 432 | 2N4916 |
| Constant voltage source 435 | z25 volts DC |
| Constant voltage source 436 | z25 volts DC |
| Resistor 437 | 2.2 KΩ |
| Resistor 440 | 4.3 X |
| Constant voltage source 442 | +25 volts DC |

TEMPERATURE INDICATOR CIRCUIT

Figure 6:
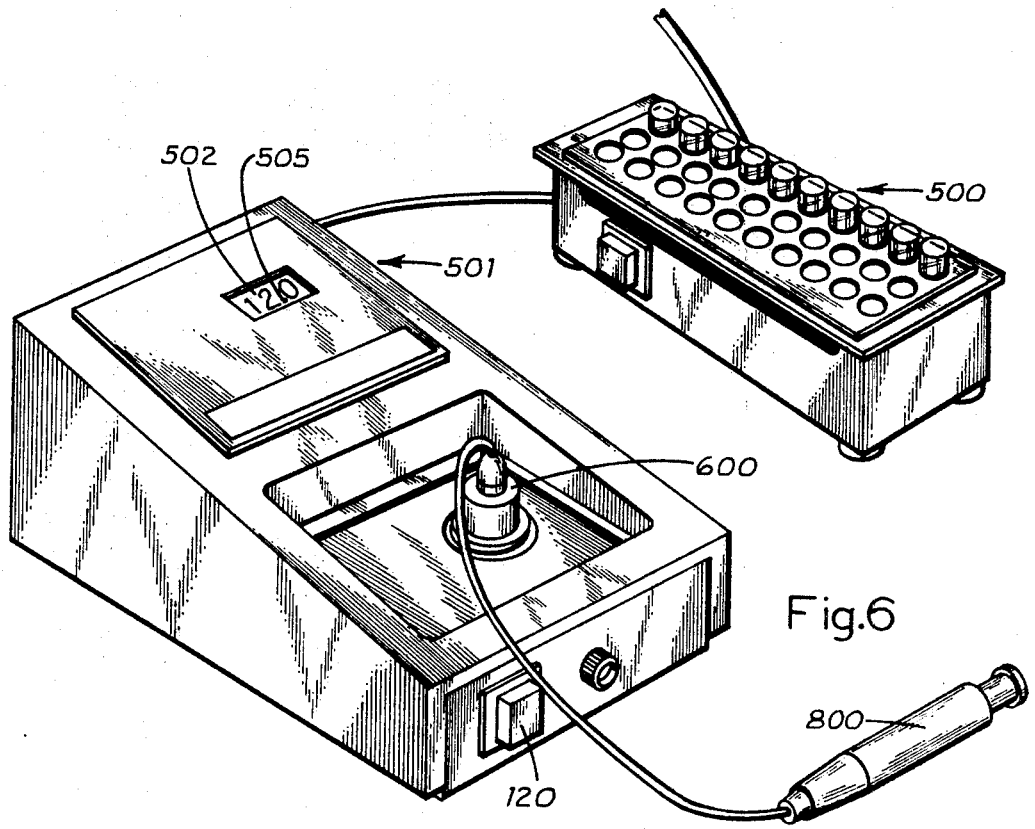
FIG. 6 is a perspective view of the coagulation meter of the present invention.

Referring to FIG. 6 the coagulation meter of this invention is illustrated as including auxiliary cuvette heating apparatus 500 as well as housing 501 which has a numerical display 502 thereon. The display has a lighted decimal point 505 which is blinked in the present apparatus when the temperature is above or below 37° C. Thus the operator of the device is alerted not to use the device until the decimal point stops blinking. The circuit 506 which controls the blinking of the decimal point includes input line 507 which leads from FIG. 1 to FIG. 2 and connects the output of the amplifier 412 to the circuit 506. The circuit 506 further includes transistors 507, 510, 511, 512 and 515 as well as resistors 516, 517, 518, 520, 521, 522, 525, 526, 527 and 528 as well as constant voltage sources 527' and 530 and ground connections 531, 532 and 533.

The transistor 515 has its collector leg 516 connected to the filament 540 for the decimal point in the display tube 541. A regular pulse is supplied through the line 542 to the base 545 of the transistor 515 from a time base circuit 546 described below. So long as the transistor 511 is turned off, the regular pulse from the line 542 controls the transistor and causes the decimal point to blink. However, when the transistor 511 is turned on, a constant current path is provided into the base 545 of the transistor 515 maintaining it on. When the incubator temperature is precisely 37° C., the base voltage at the base of the transistor 510 will be approximately 5 volts DC and the base voltage at the base of the transistor 511 will be 3 volts DC. The emitter voltage of both of these transistors is set at 4 volts by means of the adjustable wiper and resistor 525. The transistor 512 serves as a zener diode and sets the junction 550 of resistors 526 and 527 at a precise voltage of approximately 6 volts. Consequently the emitters of the transistors 510 and 511 are at 4 volts.

Thus transistor 511 will be turned on and transistor 510 will be turned off and the decimal point will not blink. Assume now that the incubator temperature increases. The output of the amplifier 412 will increase and the voltage at the junctions 520' and 521' will decrease because the transistor 507 will have a greater voltage drop across it. When the base of transistor 510 goes to a less than 4 voltage DC, the transistor 510 will turn on effectively removing the forward bias across the transistor 511 and thus turning off transistor 511. The decimal point will therefore blink until the transistor 511 is again turned on by a 37° C. temperature.

Assume now that the temperature at the incubator decreases from 37° C. The output of the amplifier 412 will decrease so as to cause the transistor 507 to turn on more effectively and so as to cause the voltage at the junctions 520' and 521' to increase to the point where the voltage at the base of transistor 511 is sufficient to turn the transistor off whereupon the decimal point again blinks. Thus only when the temperature remains at approximately 37° C. will the decimal point remain on.

In said specific embodiment the following parameters and components are used:

| Constant voltage source 527 | +25 volts |
|---|---|
| Constant voltage source 530 | +25 volts |
| Transistor 507 | 2N4125 |
| Transistor 510 | 2N4126 |
| Transistor 511 | 2N4126 |
| Transistor 512 | 2N4916 |
| Transistor 515 | 2N1893 |
| Resistor 516 | 6.2 KΩ |
| Resistor 517 | 560 Ω |
| Resistor 518 | 1.6 KΩ |
| Resistor 520 | 10 KΩ |
| Resistor 521 | 10 KΩ |
| Resistor 522 | 270 Ω |
| Resistor 525 | 500 Ω |
| Resistor 526 | 2.2 KΩ |
| Resistor 527 | 270 Ω |
| Resistor 528 | 4.7 KΩ |

MANUAL RESET CIRCUIT

Prior to the running of a test it is necessary to remove the numerical reading from the display and to stabilize the differentiator circuit when it is thrown out of balance by the inserting of a cuvette into the cuvette receptacle. Because of the high time constant of the circuit, a substantial amount of time on the order of 720 seconds would otherwise be required for the circuit to stabilize. The manual reset circuit might be called a one-shot multivibrator circuit and includes the reset switch 120 located on the front of the instrument as well as transistors 600 and 601 and gate 602 and resistors 605, 606, 607, 610 and 611. Assume the switch 120 is closed. Current flows through the resistor 607 causing the input terminal 612 of gate 602 to go to a "1" and therefore causing the output terminal 615 of the gate to go to a "0." The switch 120 is connected at 616 to a 30 volt unregulated DC source. Prior to closing of the switch 120, the terminal 617 will be at "0" because the transistor 600 will be turned on. The "0" on the terminal 615 will be transmitted through the line 617 and capacitor 620 to the base 621 of the transistor 600 turning off the transistor until the base voltage again returns to 6 volts. The voltage on the base will return to 6 volts by reason of current flowing into the capacitor 620 through the resistor 605 from the constant voltage source 621. Since the resistance of resistor 605 is 50 KΩ and the capacitance of capacitor 620 is 47 mfd., the time required to charge the capacitor is:

$$T = (0.7)(R_{605})(C_{620})$$
$$= (0.7)(150 \times 10^3)(47 \times 10^{16})$$
$$= 8 \text{ seconds}$$

When the transistor 600 turns off, the input pin 617 of the gate 602 goes to a "1," thus locking in the "0" on the output 615 of the gate 602 until the transistor turns on again 8 seconds later. Prior to closing the reset switch, the transistor 601 is turned on by the "1" on its base; however, the "0" on the base of the transistor 610 turns it off so that current is supplied to the line 625 from the constant voltage source 626. This means a "1" is placed on the line 121 which is also shown in FIG. 1. Both flip-flop circuits receive the input signal at their pins 292 and 200.

As far as the differentiating and detecting circuits are concerned, the effect of placing the "1" on the line 121 for a period of 8 seconds and then returning the line to a "0" is to turn on the transistor 105 for balancing the differentiator circuit as above described and also to put the circuits in the starting position of FIG. 5 at $t_1$. The "1" on the line 625 also is delivered through line 628 to the counting circuits 627 and numerical display tubes 541, 630 and 631. The effect of placing the "1" on the line 628 is to zero all of the counting circuits 627 so that they all produce zeros on the three display tubes 631, 630 and 541. The circuit from the display tubes includes a lead line 640 which returns to power supply 641. The various counting circuits and numerical display tubes are commercially available items and might be, for example, SN7490 decade counters by National Semiconductor, SN7441 BCD to decimal decoder to driver by National Semiconductor and display tubes Model B5750 by Burroughs.

The decimal point 540 in the display tube 541 is also controlled by the closing of the reset switch 120. Thus the "1" on the line 625 also is conducted to the line 632 which leads to the base 635 of the transistor 636. The collector 637 of the transistor 636 is connected to the line 542 while the emitter 640 is connected to ground 641. The "1" on the base 635 of the transistor puts the line 542 at ground and the base 545 at ground thus turning off the transistor 515 and turning off the decimal point 540 no matter whether the transistor 511 is turned on or not and even though the time base circuit 546 is putting out a pulsing output through the line 651.

Consider again the effect of the 8 second "1" signal on the line 121. All of the circuits are at the voltages shown in FIG. 5 at $t_4$. When the pulse comes in line 121 it follows line 700 to the input terminal 200 and causes the output terminal 190 to go from a "1" to a "0." Thus the input 290 will go from a "1" to a "0." The input "1" on the line 121 is also connected to the line 701 which, through the resistor 122, turns on the transistor 125. The base 265 of the transistor 261 is thereby caused to go to ground which turns off transistor 261 and causes the base 106 of the transistor 105 to go to the voltage of voltage source 107. The transistor 105 is thereby turned on causing the input and the output of the differentiator to have equal voltages. Because of the bias voltages, signal is thereby delivered to the detector circuit which puts out a signal turning on the transistor 157 and causing its collector to go to ground voltage. This places a "0" on the junction 165. Since the gate 180 has "0" on both its inputs, it goes to "1" at its output 187 which also places a "1" on the input 197. As mentioned, the output 190 goes to "0." The gate 116 therefore goes from a "0" to a "1" at its output 205. Even so the gate 117 is not affected and continues with a "1" at its output and a "0" at its input because the transistor 210 remains turned on.

At the time of pressing the reset button, the signal comes in the line 121 and also travels to the input terminal 292 placing a "1" on that terminal. The output terminal 191, however, is already at "0." Thus, at the time of reset, terminal 196 is at "0" and terminal 291 is at "1." On the gate 185, terminals 230 and 231 are at "0" and terminal 192 is at "1."

At the end of the 8 second period after closing of the reset switch 120, the transistor 600 again turns on and the input pin 617 goes to "0." The output pin 615 goes to a "1" because input pin 612 is also at "0." The base of transistor 601 receives a "1" turning on the transistor and placing a "0" on the output line 625. Thus a "0" is now placed on the line 121 and on input terminals 200 and 292 as well as on the base of the transistor 125 through the lines 700, 701 and resistor 122. The transistor 125 is turned off, the transistor 261 is turned on and the field effect transistor 105 is turned off. The change of pin 200 from "1" to "0" has no effect on output pin 190 because the pin 197 is at "1." Also the change of pin 292 from a "1" to a "0" has no effect on the output pin 191 which is at "0" because pin 291 is at "1" and pin 196 is at "0."

When line 625 goes from "1" to "0," line 628 does also freeing the counting circuits 627 for the counting operation. The change of the line 632 from a "1" to a "0" also turns off the transistor 636 so that the decimal point can either blink if the temperature is off or can shine continuously if the temperature is 37° C. Thus the circuit is again in readiness for the test cycle.

In said specific embodiment the following components are used:

| | |
|---|---|
| Transistor 600 | 2N4123 |
| Transistor 601 | 2N4123 |
| Resistor 605 | 50 KΩ |
| Resistor 606 | 10 KΩ |
| Resistor 607 | 15 KΩ |
| Resistor 610 | 700 Ω |
| Resistor 611 | 1 KΩ |
| Voltage source 616 | 30 volts unregulated |
| Capacitor 620 | 47 mfd. |
| Constant voltage source 621 | +5 volts |
| Constant voltage source 626 | +5 volts |
| Transistor 636 | 2N4123 |

TIME BASE AND POWER SUPPLY

The time base for the digital readout is generated by dividing the 60c.p.s. line frequency by 6 resulting in one tenth of a second pulses. These pulses come into the time base circuit 546 on the input line 700. The circuitry 701 including the resistor 702, transistor 703, resistor 705, capacitor 706, resistor 707, resistor 710, transistor 711, resistor 712 and constant voltage sources 715 and 716 constitutes a Schmitt trigger and converts the incoming alternating current into a square wave direct current output which is amplified by the amplifier 720. The amplified signal is fed into a JK flip-flop 725 which is a commercial unit manufactured, for example, by Motorola under the Model No. mc. 790.

As mentioned, the function of the time base circuit is to produce pulses at a rate of 10 per second. The particular illustrated circuit produces one pulse 10 milliseconds wide every 100 milliseconds and includes the five "and" gates 730, 731, 735, 732 and 736, a 3.6 volt source 737, ground connections 740, 741 and 742, 5 volt source 745, capacitors 746 and 747 and resistor 750. The various components in said specific embodiment have the following specific values:

| | |
|---|---|
| Capacitor 746 | 0.01 mfd. |
| Capacitor 747 | 1 mfd. |
| Resistor 750 | 6.8 KΩ |

The output of the time base circuit is fed out through the line 651 to the gate 751 and the line 542. If the line 232 is at "0" so that line 233 is at "0," the time base pulses will be delivered to the counting circuitry 627 causing the display tubes 541, 630 and 631 to display the seconds and tenths of seconds elapsed from $t_1$ as described above.

The power supply has been shown as a block box 759 having outputs 640, 700, 761, 760 and 762. The output 700 is an unregulated 30 volts while the output 760 is 25 volts regulated, output 761 is 5 volts regulated and output 762 is 3.6 volts regulated. These various outputs are connected where needed throughout the apparatus according to the required voltages set forth above. The power supply has a standard wall plug 765 which is connected to standard 60 cycle current for operation of the apparatus.

BLOCK DIAGRAM

Figure 7:
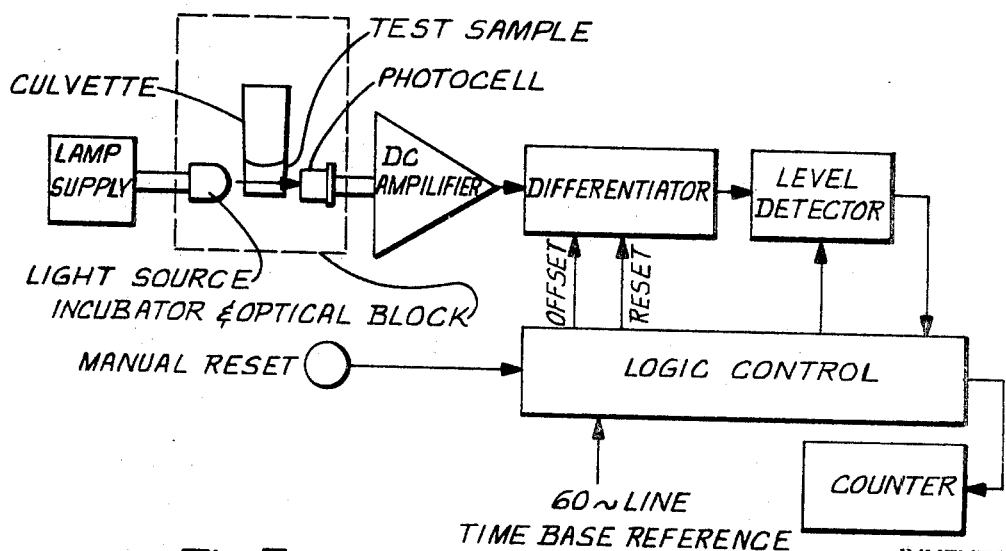
FIG. 7 is a block diagram of the coagulation meter of the present invention.

Referring now to FIG. 7, there is illustrated a block diagram which indicates the general operation of the present apparatus. The combination of the light source, photocell and cuvette may function as a nephelometer with the light being reflected or may function according to the change in light passing through the cuvette. The photocell is a part of a circuit the output of which is amplified and differentiated. It has been found that such differentiation helps avoid the problem caused by different test samples having different starting turbidities. Another operation which helps avoid this problem is labeled "offset" in FIG. 7 and refers to the reducing of the resistance between the output and the input in FIG. 1 of the circuit diagram, in other words, the turning on of the transistor 105 to permit the circuit to more quickly return to a dynamically balanced condition after the circuit has been tripped or started by reason of the insertion of plasma into the cuvette causing a substantial change in the resistance of the photocell.

This procedure can also be referred to as "automatic leveling" and it in effect "zeros the chart" so that no matter what the starting turbidity is after a short period during which the sample is "settling down," that is where the meter starts and also the meter is sensitive to only a substantial change in turbidity. Thus referring to FIG. 5 $e_1$ can go positive or negative at $t_1$ but the device is still tripped and still automatically levels.

Also shown in FIG. 7 is a counter. The counter is automatically started into counting when the plasma is injected into the cuvette by the pipette 800 (FIG. 6). As described above, however, the automatic starting does not occur because of the injected liquid throwing a switch or the like but instead occurs because of a substantial change in the resistance of the photoelectric cell which trips the circuit and provides an accurate indication of the true starting time of the test. Of course, the end of the test occurs when clotting begins to occur and the electrical effect is always in one direction. Consequently the starting of the circuit also causes a conditioning of the circuit to not respond to negative signals and only to positive signals. This tends to prevent false readings caused by drift and settling of particles and the like. Another effect of the above described."offset" is that the circuit is not responsive at all during the first 10 to 12 seconds of operation to any stopping signal of any amplitude this also preventing triggering prematurely by other false indicators such as settling of particles, drift and the like.

When used in the claims that follow, the term "differentiating" refers to ($\Delta x/\Delta t$) as well at ($dx/dt$) or, in other words, taking the change in a variable over a finite period of time as well as an infinitely small period of time.

We claim:

1. Apparatus for coagulation testing comprising a cuvette; means for inserting a test activating component into said cuvette; a photocell; a light source; said photocell, light source and cuvette being so arranged that a change in the characteristics of the contents of said cuvette affects the amount of light delivered to said photocell; a circuit including said photocell; means for differentiating the output of said circuit; means for detecting an output of a given amplitude from said differentiating means; time counting means, and means for automatically starting said time counting means through said photocell and said differentiating means and said detecting means when said inserting means inserts a test activating component into said cuvette.

2. Apparatus for coagulation testing comprising a cuvette; means for inserting a test activating component into said cuvette; a photocell, a light source; said photocell, light source and cuvette being so arranged that a change in the characteristics of the contents of said cuvette affects the amount of light delivered to said photocell; a circuit including said photocell; means for differentiating the output of said circuit; means for detecting an output of a given amplitude from said differentiating means; time counting means; means for automatically starting said time counting means through said differentiating means and said detecting means when said inserting means inserts a test activating component into said cuvette; and means for automatically stopping said time counting means when said differentiating means and said detecting means detect an output of a given amplitude.

3. The apparatus of claim 2 additionally comprising means for preventing said stopping means from operating for a given period of time after said time counting means has started.

4. The apparatus of claim 2 wherein said starting means includes means for causing said starting means to be operable in response to both negative and positive starting signals of a given amplitude; and means for causing said stopping means to be responsive to a signal of only one polarity.

5. The apparatus of claim 4 additionally comprising means for preventing said stopping means from operating for a given period of time after said time counting means has started.

6. The apparatus of claim 5 additionally comprising means for maintaining said cuvette at a temperature of 37° C, and signal means for indicating when the temperature of said cuvette is at a temperature other than 37° C.

7. The apparatus of claim 5 additionally comprising a display for said time counting means, means for resetting said apparatus after one test in preparation for a further test, and first signal means for indicating when said resetting means is in operation.

8. The apparatus of claim 7 additionally comprising means for maintaining said cuvette at a temperature of 37° C, and further signal means for indicating when the temperature of said cuvette is at a temperature other than 37° C, said display for said time counting means being lighted, one of said signal means operable to turn at least a portion of said lighted display off and the other of said signal means operable to blink at least a portion of said lighted display.